United States Patent
Parrotto

(10) Patent No.: US 9,683,876 B2
(45) Date of Patent: Jun. 20, 2017

(54) DIFFERENTIAL-PRESSURE MEASURING ASSEMBLY HAVING EFFECTIVE-PRESSURE LINES AND METHOD FOR DETECTING PLUGGED EFFECTIVE-PRESSURE LINES

(71) Applicant: Endress + Hauser GmbH + Co. KG, Maulburg (DE)

(72) Inventor: Davide Parrotto, Weil am Rhein (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 14/917,426

(22) PCT Filed: Aug. 11, 2014

(86) PCT No.: PCT/EP2014/067175
§ 371 (c)(1),
(2) Date: Mar. 8, 2016

(87) PCT Pub. No.: WO2015/036188
PCT Pub. Date: Mar. 19, 2015

(65) Prior Publication Data
US 2016/0223371 A1    Aug. 4, 2016

(30) Foreign Application Priority Data
Sep. 12, 2013  (DE) .......................... 10 2013 110 059

(51) Int. Cl.
*G01F 1/42* (2006.01)
*G01F 25/00* (2006.01)
(Continued)

(52) U.S. Cl.
CPC .................. *G01F 1/42* (2013.01); *G01F 1/36* (2013.01); *G01F 25/0007* (2013.01); *G01L 19/12* (2013.01); *G01L 27/005* (2013.01)

(58) Field of Classification Search
CPC ..... G01L 7/00; G01L 7/11; G01L 9/00; G01L 9/12; G01L 9/06; G01F 1/42
(Continued)

(56) References Cited

U.S. PATENT DOCUMENTS 7,650,245 B2 * 1/2010 Hashizume ............... G01F 1/50
340/606
9,347,847 B2 * 5/2016 Hershey ............... G01L 19/0092
(Continued)

FOREIGN PATENT DOCUMENTS

| DE | 102005055285 | | 5/2007 |
|---|---|---|---|
| DE | 102006005143 | A1 | 8/2007 |
| WO | 2015036188 | A1 | 3/2015 |

OTHER PUBLICATIONS

English Translation of the International Preliminary Report on Patentability, WIPO, Geneva, CH, Mar. 24, 2016.
(Continued)

*Primary Examiner* — Jewel V Thompson
(74) *Attorney, Agent, or Firm* — Bacon & Thomas, PLLC

(57) ABSTRACT

A differential-pressure measuring assembly comprising a differential-pressure measuring transducer for detecting the difference between the first media pressure and a second media pressure and for providing a differential-pressure measurement signal that depends on the difference between the first media pressure and the second media pressure; a first effective-pressure line, which is connected to a first pressure inlet of the differential-pressure measuring transducer in order to apply the first media pressure to the differential-pressure measuring transducer; a second effective-pressure line, which is connected to a second pressure inlet of the differential-pressure measuring transducer in order to apply the second media pressure to the differential-pressure measuring transducer; at least one temperature sensor for outputting a temperature signal that correlates
(Continued)

with a temperature of the effective-pressure lines; and a processing unit for processing the differential-pressure measurement signal and the temperature signal; wherein the processing unit is designed to detect a significant correlation between a change in the temperature signal and the differential-pressure signal on the basis of the differential-pressure measurement signal and the temperature signal, and to assess the detection of a significant correlation as an indication of a plugged effective-pressure line.

8 Claims, 1 Drawing Sheet

(51) Int. Cl.
*G01L 19/12* (2006.01)
*G01L 27/00* (2006.01)
*G01F 1/36* (2006.01)

(58) Field of Classification Search
USPC ..... 73/702, 727, 724, 700, 754, 716, 861.61
See application file for complete search history.

(56) References Cited

U.S. PATENT DOCUMENTS

| | | | |
|---|---|---|---|
| 2005/0097963 A1* | 5/2005 | Wilda | G01L 13/025 73/716 |
| 2006/0206288 A1* | 9/2006 | Brahmajosyula | G01F 1/40 702/183 |
| 2009/0097537 A1 | 4/2009 | Miller | |
| 2010/0083768 A1 | 4/2010 | Hedtke | |
| 2012/0310469 A1 | 12/2012 | Vassilieff | |
| 2016/0047681 A1* | 2/2016 | Zhang | G01F 25/0053 73/861.61 |

OTHER PUBLICATIONS

German Search Report, German Patent Office, Munich, DE, Sep. 27, 2013.
International Search Report, EPO, The Netherlands, Oct. 23, 2014.

* cited by examiner

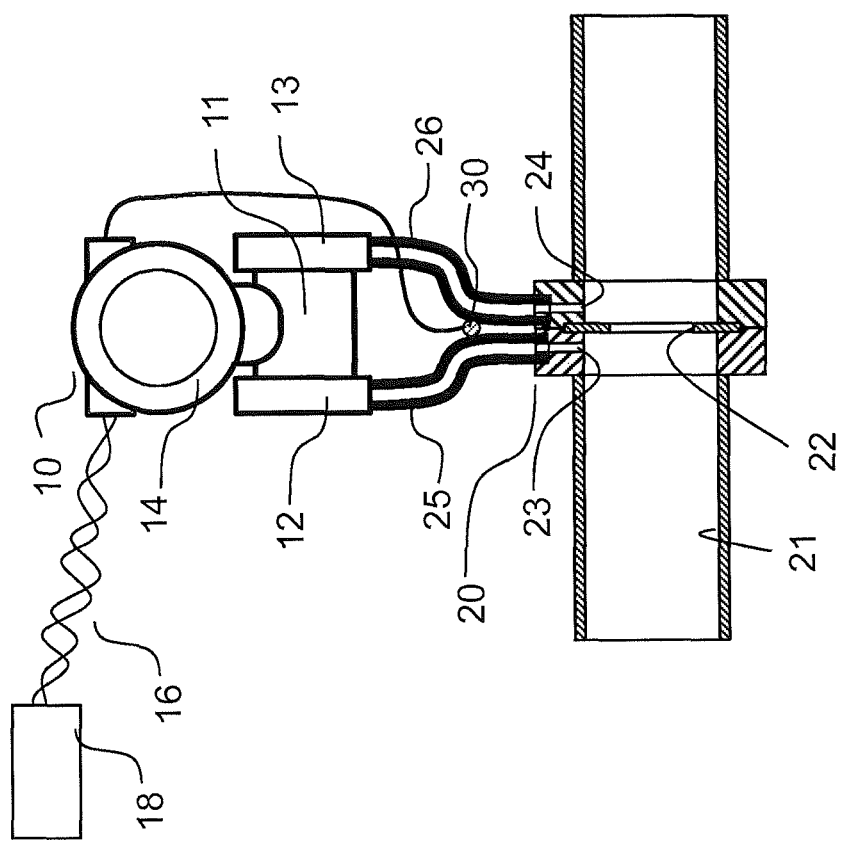

DIFFERENTIAL-PRESSURE MEASURING ASSEMBLY HAVING EFFECTIVE-PRESSURE LINES AND METHOD FOR DETECTING PLUGGED EFFECTIVE-PRESSURE LINES

TECHNICAL FIELD

This invention relates to a differential-pressure measuring assembly having effective-pressure lines and a method for detecting plugged effective-pressure lines. Differential-pressure measuring assemblies having effective-pressure lines are especially used for flow measurement or filter monitoring, wherein in the direction of flow two effective-pressure lines, one above and one below an effective-pressure transducer, such as an orifice or a Venturi nozzle, or a filter are connected to a media-carrying line to transfer the differential pressure to a differential-pressure measuring transducer of the differential-pressure measuring assembly via the medium. Operation of these measuring assemblies may lead to plugging of the effective-pressure lines, thus negatively influencing reliable measurement. Therefore, measures to detect the plugging of effective-pressure lines at an early stage are known.

BACKGROUND DISCUSSION

The European patent EP 1 840 549 B1 discloses protecting a device for detecting plugging of effective-pressure lines, wherein the device comprises two pressure sensors for detecting the time series of the static pressure in an effective-pressure line; a differential pressure sensor for detecting the time series of the difference between the pressures in the two effective-pressure lines; three calculation units for calculating the fluctuations of the two static pressures and the differential pressure based on the time series and the sums of squares of the fluctuations; and correlation-coefficient calculation units to determine the correlation coefficients between the time series for a static pressure and the differential pressure, and an evaluation unit, which detects plugging of the effective-pressure lines based on the correlations and identifies which of the effective-pressure lines is/are plugged.

Although the above approach to analyze fluctuations is purposeful as such, it is associated with considerable effort as two sensors in addition to the differential pressure sensor are required for the static pressure.

SUMMARY OF THE INVENTION

Therefore, the object of the present invention is to provide a simpler differential-pressure measuring assembly and a method which allow detection and identification of a plugged effective-pressure line. The object is achieved by the differential-pressure measuring assembly according to the invention which comprises a differential-pressure measuring transducer for detecting the difference between a first media pressure and a second media pressure and for providing a differential-pressure measurement signal that is a function of the difference between a first media pressure and a second media pressure;

a first effective-pressure line, which is connected to a first pressure inlet of the differential-pressure measuring transducer to apply the first media pressure to the differential-pressure measuring transducer;

a second effective-pressure line, which is connected to a second pressure inlet of the differential-pressure measuring transducer to apply the second media pressure to the differential-pressure measuring transducer;

at least one temperature sensor for outputting a temperature signal which is correlated with a temperature of the effective-pressure lines; and a processing unit for processing the differential-pressure measurement signal and the temperature signal;

wherein the processing unit is designed to determine a correlation between a change in the temperature signal and the differential-pressure measurement signal on the basis of the differential-pressure measurement signal and the temperature signal, and to evaluate the found correlation as an indication of a plugged effective-pressure line.

The invention is based on the consideration that a medium, which expands when heated, so as to necessarily flow past the plugging that forms a throttle, can be contained between a pressure inlet of the differential-pressure measuring transducer and a plugging in an effective-pressure line. This leads to an increase in the pressure in the plugged effective-pressure line, which affects the differential pressure to be measured.

In one further development of the invention, the evaluation unit is designed to assess a positive correlation between a temperature signal change on the one hand, which corresponds to a temperature rise, and the differential-pressure signal on the other, as an indication of a plugging in the first effective-pressure line.

In one further development of the invention, the evaluation unit is designed to assess a negative correlation between a temperature signal change on the one hand, which corresponds to a temperature rise, and the differential-pressure signal on the other, as an indication of a plugging in the second effective-pressure line.

The opposite applies accordingly in case of a change in the temperature signal that is equivalent to a drop in temperature.

In one further development of the invention, the evaluation unit is also designed to determine at least one characteristic parameter of a noise or a fluctuation in the differential-pressure measurement signal, and to consider this parameter in determining a plugged effective-pressure line.

The flow measuring assembly according to the invention comprises a differential-pressure measuring assembly according to the invention, wherein the difference between the first media pressure and the second media pressure is a measure of the flow, wherein the evaluation unit is also designed to consider a correlation between the characteristic parameter of a noise or a fluctuation and the flow or the amplitude of the differential-pressure measurement signal when determining a plugged effective-pressure line.

The invention further relates to a method for monitoring a differential-pressure measuring assembly, having a differential-pressure measuring transducer for detecting a difference between a first media pressure and a second media pressure and for providing a differential-pressure measurement signal, which is a function of the difference between a first media pressure and a second media pressure; a first effective-pressure line, which is connected to a first pressure inlet of the differential-pressure measuring transducer to apply the first media pressure to the differential-pressure measuring transducer; a second effective-pressure line, which is connected to a second pressure inlet of the differential-pressure measuring transducer to apply the second media pressure to the differential-pressure measuring transducer; and at least one temperature sensor for outputting a temperature signal that is correlated with a temperature of the effective-pressure lines, wherein the method according to the invention comprises at least the temporarily detection of a time progression of the temperature signal and of the differential-pressure measurement signal, and checking whether a significant correlation between a change in the temperature signal and the differential-pressure signal exists that is to be assessed as an indication of a plugged effective-pressure line.

In one further development of the invention, the method further comprises an analysis of a noise or a fluctuation in the differential-pressure measurement signal, and checking whether the noise or the fluctuation indicates a plugged effective-pressure line.

In one further development of the invention, a plugged effective-pressure line is signaled if the noise or the fluctuation indicates a plugged effective-pressure line, wherein the plugged effective-pressure line is identified, based on a significant correlation between a change in the temperature signal and the differential-pressure signal.

BRIEF DESCRIPTION OF THE DRAWING

The sole FIGURE is an elevational view of the differential pressure assembly of the invention.

DETAILED DISCUSSION IN CONJUNCTION WITH THE DRAWING

The exemplary embodiment of a differential-pressure measuring assembly according to the invention shown in FIG. 1 comprises a differential-pressure measuring transducer 10, having a sensor module 11, which is arranged between a first, high-pressure-side process adapter flange 12 and a second, low-pressure-side process adapter flange 13, and an electronic module 14, which is held by the sensor module 11, supplies power to the sensor module and processes signals of the sensor module. The electronic module is connected to a process control system 18 via a two-wire line 16, wherein the two-wire line is used for communication and power supply to the electronic module 14. The two-wire line can be operated, in particular as a field bus according to the Profibus or Foundation Fieldbus standard or the HART standard. Such differential-pressure measuring transducers are known per se and are manufactured and marketed, e.g., under the brand Deltabar by the applicant. The differential-pressure measuring assembly also includes an effective-pressure transducer 20 for installation in a pipeline 21. The effective-pressure transducer includes an orifice 22, a first pressure-tapping channel 23 on a high-pressure side of the orifice 22 and a second pressure-tapping channel 24 on a low-pressure side of the orifice 22. The high-pressure-side process adapter flange 12 is connected to the high-pressure-side pressure-tapping channel 23 via a high-pressure-side effective-pressure line 25, and the low-pressure-side process adapter flange is connected to the low-pressure-side pressure-tapping channel 24 via a low-pressure-side effective-pressure line 26. The terms "high-pressure-side" and "low-pressure-side" refer to a pressure difference, which is caused by a flow (from left to right in the drawing), is proportional to the square of the flow rate and is, e.g., in the order of 1 to 10 kPa (10 to 100 mbar). The static pressure, by which this flow-dependent pressure difference is superimposed can be, e.g., 0.1 MPa (1 bar) to several 10 MPa (100 bar).

The pressure difference is detected by a sensor element of the sensor module 11, wherein the sensor module outputs a sensor module signal that depends on the detected pressure difference to the electronic module 14, wherein the processing circuit of the electronic module 14 generates, based on the sensor module signal, a differential-pressure measurement signal that represents the pressure difference and outputs it to the process control system 18 via the two-wire line 16.

Time series of the differential-pressure measurement signal and/or of fluctuations in the differential-pressure measurement signal can be stored in a data memory of the electronic module and/or the process control system.

Furthermore, the differential-pressure measuring assembly comprises a temperature sensor 30 which detects a temperature of the effective-pressure lines. A single temperature sensor is sufficient if it can be assumed that the temperature of the effective-pressure lines is substantially the same, whereas it may be advantageous to provide a temperature sensor for each effective-pressure line if strongly deviating temperature gradients are expected. The temperature sensor 30 is connected to the electronic module 14, and provides to the electronic module, temperature measurement signals, each of which represents a currently measured temperature. Time series of the temperature measurement signals and their fluctuations can be stored in the measuring transducer and/or in the control system.

Based on the time series of the differential-pressure measurement signals and the measured temperature values or the corresponding fluctuations, it is determined whether an effective-pressure line is plugged and if so, which one.

As known from the prior art, plugging of the effective-pressure lines can be detected by an analysis of the fluctuations or noise of the differential-pressure measurement signal. Basically, the present invention can be linked to any of the fluctuation analyses as follows:

Time series of the differential-pressure measurement signals are evaluated for several hours, e.g. 8 to 16 hours, in terms of their fluctuation or noise and their correlation with the respective time series of the measured temperature values, wherein a comparison with reference data that was detected in a reference state of the system is advantageous, in particular in the analysis of the fluctuation or noise.

Basically, it must be assumed that fluctuations or noise in the pressure of a flowing medium are greater with increasing flow rate of the medium. In an intact flow measuring assembly, these fluctuations will reach the differential-pressure measuring transducer via both effective-pressure lines, and compensate each other out there to some extent.

If an effective-pressure line is plugged now, this compensation will become weaker with time, so that the fluctuations or the noise of the differential-pressure measurement signal increase. This involves, in particular, fluctuations in a frequency range of more than 1 Hz, in particular more than 10 Hz or more than 100 Hz.

If fluctuation in the differential-pressure measurement signal at a given flow rate or average differential pressure has increased when compared with reference data that were collected with the effective-pressure lines open, this is a first indication of a completely or partially plugged reference-pressure line.

The invention now contributes to the prevention of faulty diagnosis of a plugged effective-pressure line due to increasing fluctuations in the differential-pressure measurement signal.

The likelihood of plugging in case of a detected increase in the fluctuation P (V|F+) is given as:

$$P(V|F+)=P(F+|V)*P(V)/[P(F+|V)*P(V)+P(F+|\text{free})*P(\text{free})] \quad (1)$$

Where: P(F+|V) is the probability that an increasing fluctuation is detected in case of plugging, P(V) is the probability that an effective-pressure line is plugged, P(F+|free) is the probability that an increase in fluctuations is detected in a free effective-pressure line, and P(free) is the probability that an effective-pressure line remains free.

For purposes of illustration, if it is assumed that 2% of all effective-pressure lines fail due to plugging, wherein a plugged effective-pressure line leads to a 99% probability of detecting an increase in the fluctuations, and if it is further assumed that a free effective-pressure line leads to a probability of only 4% in finding increased fluctuation, then the probability of plugging according to equation 1 is only one-third in case of a detected increase in the fluctuation P(V|F+).

This is not a comfortable situation for the operator of a process plant, who has to decide on the basis of the finding whether the plant must be stopped and serviced, as two out of three maintenance measures would be unnecessary.

By analyzing a correlation between a change in the temperature measurement signal and the differential-pressure measurement signal, an independent approach to detection of plugging is now given, because a change in temperature and a consequent change in volume of the medium causes a change in pressure in the effective-pressure line, which has a direct effect on the measured differential pressure if a medium is contained in an effective-pressure line due to plugging. If the plugging is not yet complete, then medium should flow to or away from the resulting plugging, which acts as a throttle, for volume compensation in case of a temperature change. This also causes a pressure change in the affected effective-pressure line, which affects the differential-pressure measurement signal.

Therefore, a correlation between a change in the temperature measurement signal and the differential-pressure measurement signal is an indication of plugging that is independent of the fluctuation analysis of the differential-pressure measurement signal. By combining the above two methods of analysis, a conclusion about a detected plugging becomes more reliable as explained below.

The probability of plugging in case of a detected correlation between a change in the temperature measurement signal and the differential-pressure measurement signal P(V|K) is given as:

$$P(V|K) = P(K|V)*P(V)/[P(K|V)*P(V)+P(K|\text{free})*P(\text{free})] \quad (2)$$

Where: P(K|V) is the probability that a correlation between the change in the temperature measurement signal and the differential-pressure measurement signal is detected in case of plugging, P(V) is the probability that an effective-pressure line is plugged, P(K|free) is the probability that a correlation between the change in the temperature measurement signal and the differential-pressure measurement signal is detected in a free effective-pressure line, and P(free) is the probability that an effective-pressure line remains free.

For purposes of illustration, if it is again assumed that 2% of all effective-pressure lines fail due to plugging, wherein a plugged effective-pressure line leads to a 90% probability of detecting an increase in the fluctuations, and if it is further assumed that a free effective-pressure line leads to a probability of 10% in detecting a correlation between the change in the temperature measurement signal and the differential-pressure measurement signal, then the probability of plugging according to equation 2 is only one-sixth in case of a detected correlation between the change in the temperature measurement signal and the differential-pressure measurement signal P(V|F+). When considered separately, this test is worse than the fluctuation test. However, the combination of these two independent tests results in a significant increase in the reliability of detecting plugging.

If, for example, a positive result in the second test is assumed, then plugging of an effective-pressure line occurs with a probability of P(V)=⅙. Applying this probability P(V)=⅙ now as the initial probability of plugging in consideration of the significance of independent fluctuation analysis of plugging, then the following applies according to equation 1 with assumptions that are unchanged otherwise:

$$P(V|F+) = P(F+|V)*P(V)/[P(F+|V)*P(V) + P(F+|\text{free})*P(\text{free})]$$

$$= 99\%*1/6/[99\%*1/6 + 4\%*5/6]$$

$$\approx 5/6$$

By combining the two tests, the reliability of detecting plugging would have increased from ⅓ to ⅚, i.e. with the validity of the boundary conditions assumed. This would be an improvement in the prediction by two and a half times, although the second test was assumed to be even less reliable than the first test.

Based on the two analyses, the indications of plugging can be summarized as follows:
- If the high-pressure-side effective-pressure line 25 is plugged, the fluctuation of the differential-pressure measurement signal increases and the correlation of the differential-pressure measurement signal approaches +1 with changes in the measured temperature value.
- If the low-pressure-side effective-pressure line 26 is plugged, the fluctuation of the differential-pressure measurement signal increases and the correlation of the differential-pressure measurement signal approaches −1 with changes in the measured temperature value.
- If both effective-pressure lines are open, an unchanged fluctuation in the differential-pressure measurement signal can be expected and the correlation between the differential-pressure measurement signal and the changes in the measured temperature value approaches zero.
- If both effective-pressure lines are plugged, decreasing fluctuation in the differential-pressure measurement signal can be expected and the correlation between the differential-pressure measurement signal and the changes in the measured temperature value approaches zero.

In an ongoing measuring operation, the two diagnostic routines discussed can periodically be performed on fluctuations in the differential-pressure measurement signal and on correlations between changes in temperature and the differential-pressure measurement signal, wherein the state mentioned in the third column is detected and signaled, depending on the findings specified in the first and second columns.

The invention claimed is:
1. A differential-pressure measuring assembly, comprising:
a differential-pressure measuring transducer for detecting the difference between a first media pressure and a second media pressure and for providing a differential-pressure measurement signal that is a function of the difference between a first media pressure and a second media pressure;

a first effective-pressure line, which is connected to a first pressure inlet of said differential-pressure measuring transducer to apply the first media pressure to the differential-pressure measuring transducer;

a second effective-pressure line, which is connected to a second pressure inlet of said differential-pressure measuring transducer to apply the second media pressure to said differential-pressure measuring transducer;

at least one temperature sensor for outputting a temperature signal which is correlated with a temperature of the effective-pressure lines; and a processing unit for processing the differential-pressure measurement signal and the temperature signals, wherein:

said processing unit is designed to determine a significant correlation between a change in the temperature signal and the differential-pressure signal on the basis of the differential-pressure measurement signal and the temperature signal, and to evaluate the detection of a significant correlation as an indication of a plugged effective-pressure line.

2. The differential-pressure measuring assembly according to claim 1, wherein:

said evaluation unit is designed to assess a positive correlation between a temperature signal change on the one hand, which corresponds to a temperature rise, and the differential-pressure signal on the other, as an indication of a plugging in the first effective-pressure line.

3. The differential-pressure measuring assembly according to claim 1, wherein:

said evaluation unit is designed to assess a negative correlation between a temperature signal change on the one hand, which corresponds to a temperature rise, and the differential-pressure signal on the other, as an indication of a plugging in the second effective-pressure line.

4. The differential-pressure measuring assembly according to claim 1, wherein:

said evaluation unit is also designed to determine at least one characteristic parameter of a noise or a fluctuation in the differential-pressure measurement signal, and to consider this parameter in detecting a plugged effective-pressure line.

5. A flow measuring assembly, comprising:

a differential-pressure measuring assembly, comprising a differential-pressure measuring transducer for detecting the difference between a first media pressure and a second media pressure and for providing a differential-pressure measurement signal that is a function of the difference between a first media pressure and a second media pressure; a first effective-pressure line, which is connected to a first pressure inlet of said differential-pressure measuring transducer to apply the first media pressure to the differential-pressure measuring transducer; a second effective-pressure line, which is connected to a second pressure inlet of said differential-pressure measuring transducer to apply the second media pressure to said differential-pressure measuring transducer; at least one temperature sensor for outputting a temperature signal which is correlated with a temperature of the effective-pressure lines; and a processing unit for processing the differential-pressure measurement signal and the temperature signals, wherein: said processing unit is designed to determine a significant correlation between a change in the temperature signal and the differential-pressure signal on the basis of the differential-pressure measurement signal and the temperature signal, and to evaluate the detection of a significant correlation as an indication of a plugged effective-pressure line;

the difference between the first media pressure and the second media pressure is a measure of the flow; and said evaluation unit is also designed to consider a correlation between the characteristic parameter of a noise or a fluctuation and the flow or the amplitude of the differential-pressure measurement signal when detecting a plugged effective-pressure line.

6. A method for monitoring a differential-pressure measuring assembly, which comprises:

a differential-pressure measuring assembly, comprising: a differential-pressure measuring transducer for detecting the difference between a first media pressure and a second media pressure and for providing a differential-pressure measurement signal that is a function of the difference between a first media pressure and a second media pressure; a first effective-pressure line, which is connected to a first pressure inlet of said differential-pressure measuring transducer to apply the first media pressure to the differential-pressure measuring transducer; a second effective-pressure line, which is connected to a second pressure inlet of said differential-pressure measuring transducer to apply the second media pressure to said differential-pressure measuring transducer; at least one temperature sensor for outputting a temperature signal which is correlated with a temperature of the effective-pressure lines; and a processing unit for processing the differential-pressure measurement signal and the temperature signals, wherein: said processing unit is designed to determine a significant correlation between a change in the temperature signal and the differential-pressure signal on the basis of the differential-pressure measurement signal and the temperature signal, and to evaluate the detection of a significant correlation as an indication of a plugged effective-pressure line, comprising the steps of:

providing a differential-pressure measuring assembly, having a differential-pressure measuring transducer for detecting a difference between a first media pressure and a second media pressure and for providing a differential-pressure measurement signal, which is a function of the difference between the first media pressure and the second media pressure;

providing a first effective-pressure line, which is connected to a first pressure inlet of the differential-pressure measuring transducer to apply the first media pressure to the differential-pressure measuring transducer; providing a second effective-pressure line, which is connected to a second pressure inlet of the differential-pressure measuring transducer to apply the second media pressure to the differential-pressure measuring transducer; and at least one temperature sensor for outputting a temperature signal that is correlated with a temperature of the effective-pressure lines, wherein the at least the temporarily detection of a time progression of the temperature signal and of the differential-pressure measurement signal; and checking whether a significant correlation between a change in the temperature signal and the differential-pressure signal exists that is to be considered as an indication of a plugged effective-pressure line.

7. The method according to claim 6, wherein the method further comprises the steps of:
- an analysis of a noise or a fluctuation in the differential-pressure measurement signal, and checking whether the noise or the fluctuation indicates a plugged effective-pressure line.

8. The method according to claim 7, wherein:
- a plugged effective-pressure line is signaled if the noise or the fluctuation indicates a plugged effective-pressure line, the plugged effective-pressure line is identified, based on a significant correlation between a change in the temperature signal and the differential-pressure signal.

* * * * *